United States Patent [11] 3,611,182

[72] Inventor  Edmond B. Treacy
              Vernon, Conn.
[21] Appl. No. 777,002
[22] Filed     Nov. 19, 1968
[45] Patented  Oct. 5, 1971
[73] Assignee  United Aircraft Corporation
               East Hartford, Conn.

[54] OPTICAL CHIRP PULSE GENERATOR
     8 Claims, 3 Drawing Figs.
[52] U.S. Cl. .................................................... 331/94.5,
                                                                   356/5
[51] Int. Cl. ...................................................... H01s 3/11
[50] Field of Search ............................................ 331/94.5

[56]                References Cited
                UNITED STATES PATENTS
3,448,404   6/1969  McFarlane .................. 331/94.5
3,299,368   1/1967  Klebba ......................... 331/94.5
                FOREIGN PATENTS
  984,590   2/1965  Great Britain ................ 331/94.5

*Primary Examiner*—John Kominski
*Assistant Examiner*—Darwin R. Hostetter
*Attorney*—Donald F. Bradley

ABSTRACT: Pulses of light are generated by a laser oscillator, and the pulses are swept in frequency or chirped by rotating one of the resonator mirrors in such a way as to change the oscillator frequency continuously during the generation of the pulse.

PATENTED OCT 5 1971 3,611,182

INVENTOR
EDMOND B. TREACY
BY Donald F. Bradley
ATTORNEY

OPTICAL CHIRP PULSE GENERATOR

The invention herein described was made in the course of or under a contract or subcontract thereunder with the Department of the Navy.

BACKGROUND OF THE INVENTION

A chirped pulse is one in which the carrier frequency is swept. Chirped pulses are well known in the microwave radar field. The advantage of chirped pulses in increasing the resolution ability of microwave monopulse radars is also well known, namely, the extra phase information capability resulting from the quadratic part of the phase shift, enabling more information to be obtained on the structure of a radar target.

With the advent of the laser, optical radar has become of considerable interest due to the large bandwidths and short pulse capabilities of lasers. The ability to chirp a laser pulse would further enhance the performance of optical radar. However, up to the present time it has not been feasible to generate a chirped optical or laser pulse.

This invention teaches a simple and convenient way to provide a frequency sweep to a laser pulse.

BRIEF SUMMARY OF THE INVENTION

In accordance with a preferred embodiment of this invention, a laser medium such as a carbon dioxide gas laser is inserted in a feedback cavity comprising two mirrors. One of the feedback mirrors is offset slightly and is driven by a motor to rotate it in such a way as to change the distance between the two mirrors. By properly selecting the mirror spacing, rate of rotation and laser medium, a single oscillating mode may be made to sweep through the entire gain bandwidth of the laser, that is, there is never more than one oscillating mode at any instant. The laser output pulse will thus be frequency swept through the laser medium's gain bandwidth.

It is therefore an object of this invention to generate chirped laser pulses.

Another object of this invention is the use of a rotating feedback mirror to generate chirped pulses in a laser oscillator.

Other objects, features and advantages of the present invention will become more apparent in the light of the following detailed description of the preferred embodiment thereof, as illustrated in the accompanying drawings.

DESCRIPTION OF THE PREFERRED EMBODIMENT

The phase function of a linear chirped pulse is represented by $\Phi(t) = \omega t + 1/2\, \mu t^2$. The phase is changing at the rate $\frac{\partial \phi}{\partial t} = \omega + \mu t$, where the constant $\mu$ is the frequency sweep rate. Chirped pulses are used in radar in the microwave region, and are of considerable interest in optical radar systems and in the investigation of atomic and molecular systems.

Figure 1:
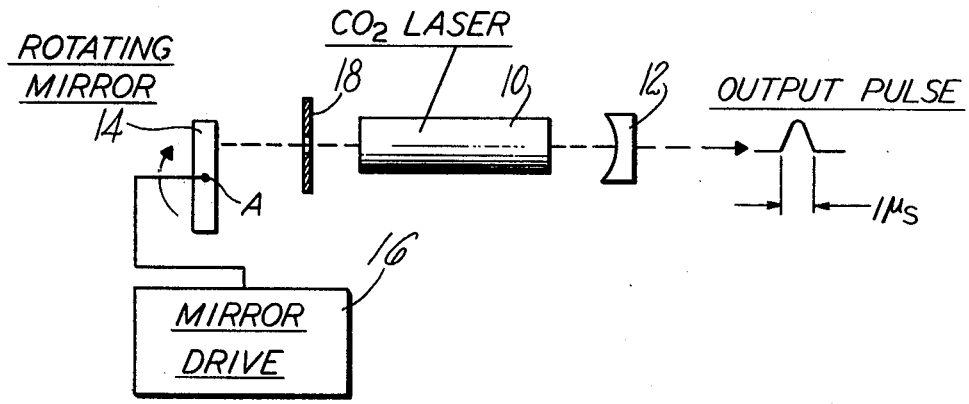
FIG. 1 shows schematically the preferred embodiment of the laser oscillator.

FIG. 1 shows the generation of chirped pulses at 10.6-microns wavelength by a $CO_2N_2$-He laser 10. The laser 10 is of standard design, oscillating in the 001→100 vibrational band of carbon dioxide. The gas mixture in the laser tube has a pressure of about 8 torr, giving a bandwidth of about 60 MHz above oscillation threshold.

One part of the optical feedback cavity is formed by a mirror or reflector 12 which may be either flat or, as shown, spherical and of large radius. The mirror 12 is shown separated from laser tube 10, but the mirror may be attached to the laser tube.

The other part of the feedback cavity is formed by a mirror 14 spaced from the end of laser tube 10 and adapted to be rotated about an axis shown at A. Mirror 14 is mounted with its rotation axis offset from the laser axis, and is driven by a synchronous motor or other driving means shown as mirror drive 16. It is immaterial in which direction the mirror is rotated.

As mirror 14 rotates, the length of the laser feedback cavity, that is, the distance between mirrors 12 and 14, changes continuously. This produces a sweeping of the mode spectrum across the laser gain profile, and results in a chirped output pulse. The frequency spacing of the modes changes slightly as a result of the change in mirror spacing, but this effect is insignificant and does not affect the generation of chirped output pulses.

Figure 2:
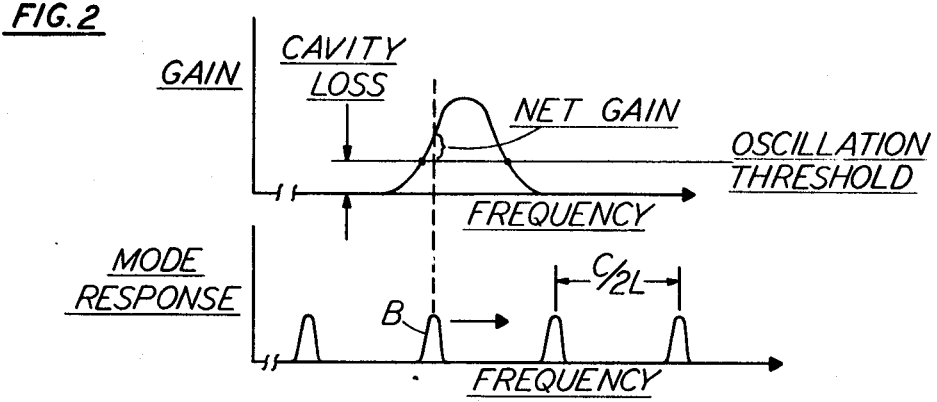
FIG. 2 shows the mode response and gain of the laser oscillator as a function of frequency.

Carbon dioxide is well adapted to producing a chirped pulse because of its relatively narrow spectral range of $10^8$ cycles, as compared with, for example, helium-neon, in which the spectral range is $10^9$ cycles. As a result, a single dominant mode can easily be isolated by judicious selection of the feedback cavity mirror spacing. Specifically, the longitudinal mode spacing is equal to the speed of light divided by the transit time within the feedback cavity, or c./2L. As shown in FIG. 2, for a mirror spacing of about 150 cm., the dominant mode spacing is about 100 MHz, and thus only one mode shown at B is within the gain band of the $CO_2$ laser at any instant.

FIG. 2 also shows the gain of the $CO_2$ laser with frequency, and the cavity loss which must be overcome before oscillation begins. The frequency between points C and D is about 60 MHz, the gain bandwidth of $CO_2$.

For an offset of 1.3 cm. between the axis of rotation A of the mirror 14 and the laser mode axis, and a speed of rotation of mirror 14 of 1,800 r.p.m., the dominant mode B sweeps across the gain bandwidth in about $1\mu$ sec., and this determines the length of the output pulse.

An aperture 18 in the form of a circular iris positioned near the rotating mirror 14 will prevent all but the dominant laser modes from oscillating by causing the diffraction losses of the other modes to be too high to permit laser action.

If internal mirror 12 is flat, one pulse is generated for each rotation of mirror 14. However, if mirror 12 is spherical, a train of several pulses may be generated with a pulse spacing of about $2\mu$ sec., the time for the cavity length to change by one-half wavelength. In either case, the output is simultaneously Q-switched and chirped.

Figure 3:
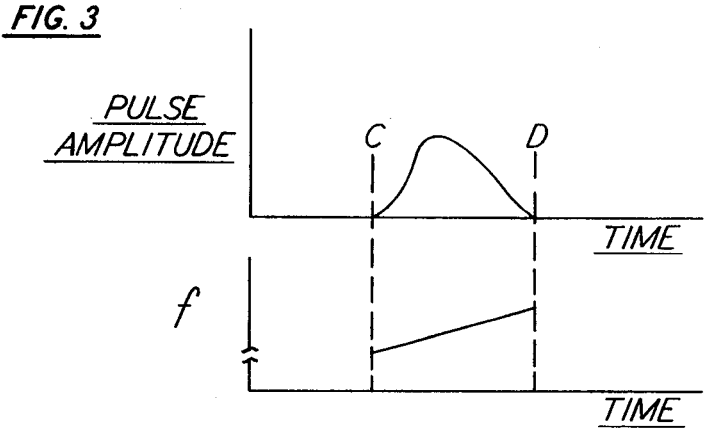
FIG. 3 shows the pulse amplitude and frequency response of the laser oscillator as a function of time.

The frequency sweep and amplitude of the output pulse are shown in FIG. 3. The frequency of the output pulse is varied linearly with respect to time if mirror 14 is rotated at a constant rate. The pulse amplitude of the output pulse shown in FIG. 3 is slightly unsymmetrical.

The frequency sweep within the pulse is determined by a combination of Doppler shifts on successive reflections from the moving mirror, dispersion in the laser medium, and coupling between the cavity mode and all of its loss mechanisms.

The rate of change of phase with respect to time, $\frac{\partial \phi}{\partial t}$, any instant during the oscillation is determined by the same formula that gives the oscillation frequency for a static resonator with the corresponding dimensions, that is $$\frac{\partial \phi}{\partial t} = \frac{[\nu_e(L) + \sigma \nu_L]}{(1+\sigma)}$$

. Here, $Y_e$ and $Y_L$ are the frequencies of the cavity and the line center, respectively, and $\sigma$ is the ratio of the half-width of the cavity and the spectral line. Since $\sigma$ is determined in part by the output coupling from the laser, this coupling should be small, about 10 percent.

The frequency sweep of a pulse generated in accordance with this invention has been observed by passing the laser beam through a Michelson interferometer and observing the beat between the pulses that arrive at a detector with different time delays.

The output pulse may be coupled out of the laser in a variety of ways. As shown, mirror 12 has a lower reflection coefficient than mirror 14, and thus the output pulse occurs through mirror 12. Auxiliary mirrors may also be used. It is important that the coupling coefficient be kept sufficiently small that the frequency of oscillation at any time is determined by the cavity frequency.

The generation of a chirped pulse is not limited to a $CO_2$ laser, but may be generated in any laser in which a single mode may be isolated. As an example, helium-neon lasers may also be operated as described. In lasers with high-mode densities, the frequency range of the chirped pulse may be limited.

It is to be understood that the invention is not limited to the specific embodiment herein illustrated and described but may be used in other ways without departure from its spirit as defined by the following claims.

I claim:

1. An oscillator for generating a chirped optical pulse comprising a laser medium, an optical feedback cavity for said laser medium including first and second end reflectors, one of said reflectors being spaced from said laser medium and being positioned for rotation about an axis longitudinally offset from and perpendicular to the optical axis of said laser medium, means for energizing said laser medium to produce an optical pulse, and means for rotating said spaced reflector to continuously vary the length of said optical feedback cavity and thereby vary the frequency of said oscillator during generation of said pulse.

2. An oscillator as in claim 1 in which said spaced reflector is flat.

3. Apparatus as in claim 1 in which said other reflector is flat.

4. Apparatus as in claim 1 in which said other reflector is spherical.

5. Apparatus as in claim 1 in which said laser medium is a gas discharge laser.

6. Apparatus as in claim 5 in which said laser medium contains carbon dioxide.

7. Apparatus as in claim 1 in which the distance between said reflectors is selected to produce only one dominant longitudinal mode within said optical feedback cavity.

8. Apparatus as in claim 1 and including an aperture within said optical feedback cavity to prevent oscillation of transverse modes.